United States Patent
Li

(10) Patent No.: US 11,573,730 B2
(45) Date of Patent: Feb. 7, 2023

(54) DATA STORAGE DEVICE WITH MULTI-STAGE CONTROLLER FURTHER INCLUDING HOST BRIDGE CONTROLLER WITH UPPER ON-CHIP AND LOWER ON-CHIP BACK-END MEMORY CONNECTION

(71) Applicant: Silicon Motion, Inc., Jhubei (TW)

(72) Inventor: An-Pang Li, New Taipei (TW)

(73) Assignee: SILICON MOTION, INC., Jhubei (TW)

( * ) Notice: Subject to any disclaimer, the term of this patent is extended or adjusted under 35 U.S.C. 154(b) by 108 days.

(21) Appl. No.: 17/204,067

(22) Filed: Mar. 17, 2021

(65) Prior Publication Data

US 2021/0373798 A1    Dec. 2, 2021

(30) Foreign Application Priority Data

May 29, 2020   (TW) .................................. 109117976

(51) Int. Cl.
*G06F 3/06*    (2006.01)

(52) U.S. Cl.
CPC ............ *G06F 3/0655* (2013.01); *G06F 3/061* (2013.01); *G06F 3/0679* (2013.01)

(58) Field of Classification Search
CPC ....... G06F 3/061; G06F 3/0679; G06F 3/0655
See application file for complete search history.

(56) References Cited

U.S. PATENT DOCUMENTS

| 5,644,729 | A | 7/1997 | Amini et al. |
| 10,387,046 | B2 | 8/2019 | Mai et al. |
| 10,592,419 | B2 | 3/2020 | Lee et al. |
| 2016/0283375 | A1* | 9/2016 | Das Sharma ....... G06F 13/4282 |
| 2017/0364277 | A1 | 12/2017 | Cheng et al. |
| 2018/0165009 | A1 | 6/2018 | Hsiao et al. |
| 2021/0311739 | A1* | 10/2021 | Malladi ............... G06F 13/1694 |

FOREIGN PATENT DOCUMENTS

| TW | 225594 B | 6/1994 |
| TW | 201800929 A | 1/2018 |
| TW | 201821994 A | 6/2018 |
| TW | I661310 B | 6/2019 |

* cited by examiner

*Primary Examiner* — Tammara R Peyton
(74) *Attorney, Agent, or Firm* — McClure, Qualey & Rodack, LLP

(57) ABSTRACT

A technology for controlling non-volatile memory with a multi-stage controller is shown. The multi-stage controller uses an upper on-chip interconnect and a lower on-chip interconnect and includes a serial peripheral bus (SPI) loader, a frond-end central processing unit (FE CPU), and an arbitrator. When being connected to the lower on-chip interconnect, the SPI loader performs code loading for the multi-stage controller. After the SPI loader finishes the code loading, the SPI loader is disconnected from the lower-stage on-chip bus, and the arbitrator connects the FE CPU to the lower on-chip interconnect. This way, the communication channel between the upper on-chip interconnect and the lower on-chip interconnect is not occupied by the FE CPU.

17 Claims, 3 Drawing Sheets

DATA STORAGE DEVICE WITH MULTI-STAGE CONTROLLER FURTHER INCLUDING HOST BRIDGE CONTROLLER WITH UPPER ON-CHIP AND LOWER ON-CHIP BACK-END MEMORY CONNECTION

CROSS REFERENCE TO RELATED APPLICATIONS

This Application claims priority of Taiwan Patent Application No. 109117976, filed on May 29, 2020, the entirety of which is incorporated by reference herein.

BACKGROUND OF THE INVENTION

Field of the Invention

The present invention relates to hardware design of a controller of a non-volatile memory.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as a storage medium in a data storage device.

How to improve the hardware performance of data storage device is an important issue in the technical field.

BRIEF SUMMARY OF THE INVENTION

The present invention proposes an efficient control technology for non-volatile memory.

A data storage device in accordance with an exemplary embodiment of the present invention includes a non-volatile memory and a multi-stage controller coupled to the non-volatile memory. The multi-stage controller includes an upper on-chip interconnect and a lower on-chip interconnect. The multi-stage controller further includes a code loader, a front-end central processing unit and an arbitrator. When being connected to the lower on-chip interconnect, the code loader loads a code from a read-only memory to operate the multi-stage controller. When the code is finished loading, the code loader is disconnected from the lower on-chip interconnect and the arbitrator connects the front-end central processing unit to the lower on-chip interconnect. The communication between the front-end components and the back-end components of the multi-stage controller is improved.

The multi-stage controller may further include a back-end mailbox. The back-end mailbox is connected to the lower on-chip interconnect to receive a message that is sent from the front-end central processing unit to the back-end central processing unit of the multi-stage controller.

The programming of the non-volatile memory is described in this paragraph. The multistage controller may further include a host bridge controller connected to the upper on-chip interconnect, and a back-end memory connected to the lower on-chip interconnect. The front-end central processing unit that replaces the code loader to connect to the lower on-chip interconnect delivers a write-request message to the back-end mailbox without passing through the upper on-chip interconnect or the first communication channel from the upper on-chip interconnect to the lower on-chip interconnect. Through the upper on-chip interconnect, the first communication path, and the lower on-chip interconnect, the host bridge controller programs write data into the back-end memory for temporary storage. The temporary storage of write data is not be delayed by the transmission of the write-request message. The back-end central processing unit is connected to the lower on-chip interconnect. In such a design, the back-end central processing unit obtaining the write-request message from the back-end mailbox can immediately get the write data which is already prepared in the back-end memory. The back-end central processing unit can timely program the write data into the non-volatile memory.

The reading of the non-volatile memory is described in this paragraph. The multi-stage controller may further include a front-end command queue connected to the upper on-chip interconnect, and a back-end memory connected to the lower on-chip interconnect. The front-end central processing unit that replaces the code loader to connect to the lower on-chip interconnect delivers a read-request message to the back-end mailbox without passing through the upper on-chip interconnect or the first communication channel from the upper on-chip interconnect to the lower on-chip interconnect. The back-end central processing unit is connected to the lower on-chip interconnect. After reading the read-request message from the back-end mailbox, the back-end central processing unit reads the non-volatile memory to get read data, and programs the read data into the back-end memory for temporary storage. After finishing programming the read data into the back-end memory, the back-end central processing unit asserts a flag in the back-end memory to show that the read data is ready in the back-end memory. The data storage device may push a write command into the front-end command queue to start a handshake to the back-end memory to check the flag in the back-end memory through the upper on-chip interconnect, the first communication path, and the lower on-chip interconnect. The identification of the flag can be repeated without being postponed by the transmission of the read-request message.

In an exemplary embodiment, the first communication channel is established by connecting a first master input and output (I/O) port of the upper on-chip interconnect to a first slave I/O port of the lower on-chip interconnect. A first master I/O port of the lower on-chip interconnect is connected to a first slave I/O port of the upper on-chip interconnect to establish a second communication channel from the lower on-chip interconnect to the upper on-chip interconnect. When the code loader is connected to a second slave I/O port of the lower on-chip interconnect and the front-end central processing unit is connected to a second master I/O port of the upper on-chip interconnect as indicated by the arbitrator, the code loader loads code to the front-end central processing unit through the lower on-chip interconnect, the second communication path, and the upper on-chip interconnect. When the code loader is disconnected from the second slave I/O port of the lower on-chip interconnect and the arbitrator connects the front-end central processing unit to the second slave I/O port of the lower on-chip interconnect, the first communication channel is not occupied by transmission of requests issued by the front-end central processing unit.

The multi-stage controller may include a back-end mailbox connected to a second master I/O port of the lower on-chip interconnect. The front-end central processing unit connected to the second slave I/O port of the lower on-chip interconnect sends message to the back-end central processing unit of the multi-stage controller, and said message is delivered to the back-end mailbox.

The multi-stage controller may further include a host bridge controller and a back-end memory. The host bridge controller is connected to a second slave I/O port of the upper on-chip interconnect. The back-end memory is connected to a third master I/O port of the lower on-chip interconnect. The host bridge controller programs write data into the back-end memory for temporary storage through the first communication path.

The multi-stage controller may further include a front-end command queue connected to a third slave I/O port of the upper on-chip interconnect. A write command is pushed into the front-end command queue to start a handshake to the back-end memory to check a flag in the back-end memory through the first communication path. The flag is asserted after finishing programming read data obtained from the non-volatile memory into the back-end memory for temporary storage.

As indicated by the arbitrator, the second slave I/O port of the lower on-chip interconnect is connected to the code loader or the front-end central processing unit.

In an exemplary embodiment, the upper on-chip interconnect and the lower on-chip interconnect are implemented as an Advanced eXtensible Interface (AXI) bus.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied to a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 1:
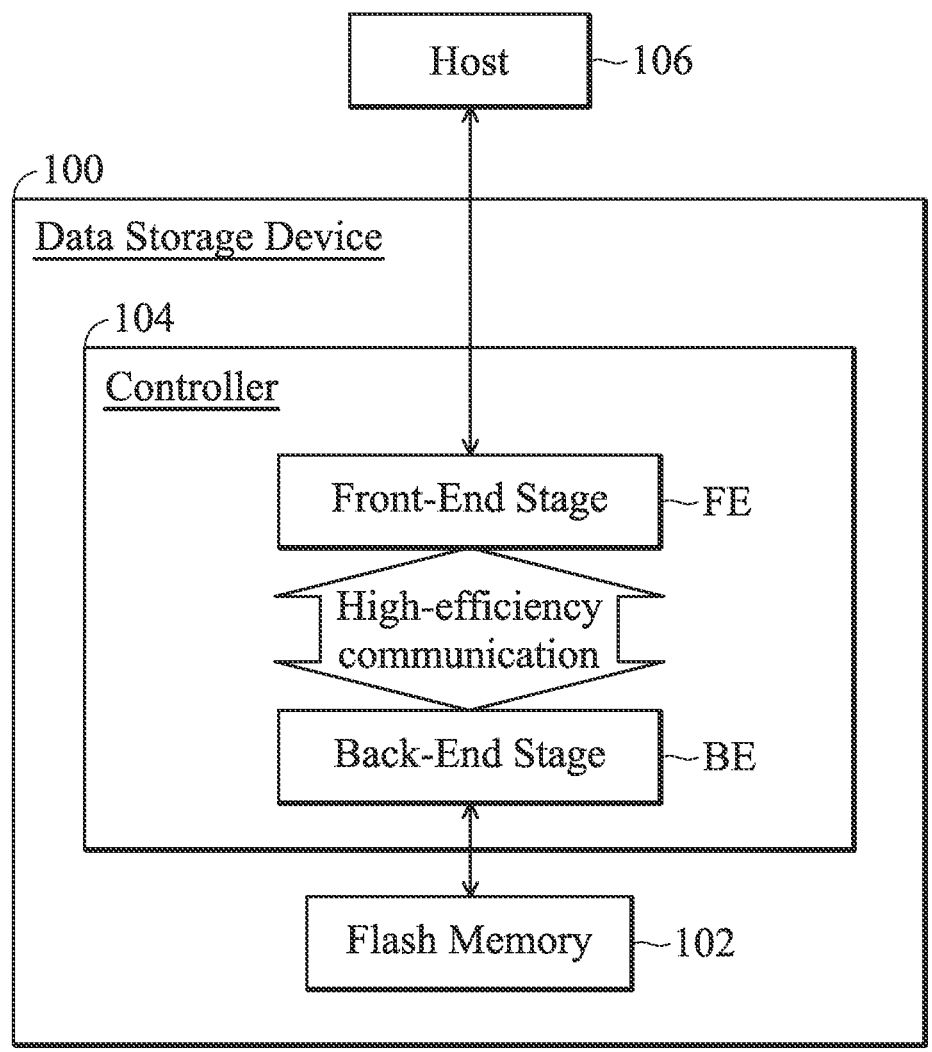
FIG. 1 is a block diagram depicting a data storage device 100 in accordance with an exemplary embodiment of the present invention.

FIG. 1 is a block diagram depicting a data storage device 100 in accordance with an exemplary embodiment of the present invention, including a flash memory 102 and a controller 104. The host 106 operates the flash memory 102 through the controller 104. The controller 104 is in a multi-stage architecture, and is called a multi-stage controller. Each stage includes at least one processor. The controller 104 shown in FIG. 1 is in a two-stage architecture, including a front-end (FE) stage and a back-end (BE) stage. A host request is preliminarily processed in the FE stage, and then sent to the BE stage to drive the components in the BE stage for accessing the flash memory 102. The prevent invention proposes a technique which results in efficient communication between the FE stage and the BE stage.

The controller 104 may be a System on Chip (SoC). An improper on-chip bus may become a performance bottleneck of a multi-stage SoC. The Advanced eXtensible Interface (AXI) bus is a feasible solution. It is a high-bandwidth, low-latency on-chip bus that can follow the Advanced Microcontroller Bus Architecture (AMBA) 3.0 protocol. Considering cost, power consumption, and area, the AXI bus can be planned as a multi-stage bus, and the AXI interconnects of the different stages are connected to each other for communication.

Figure 2:
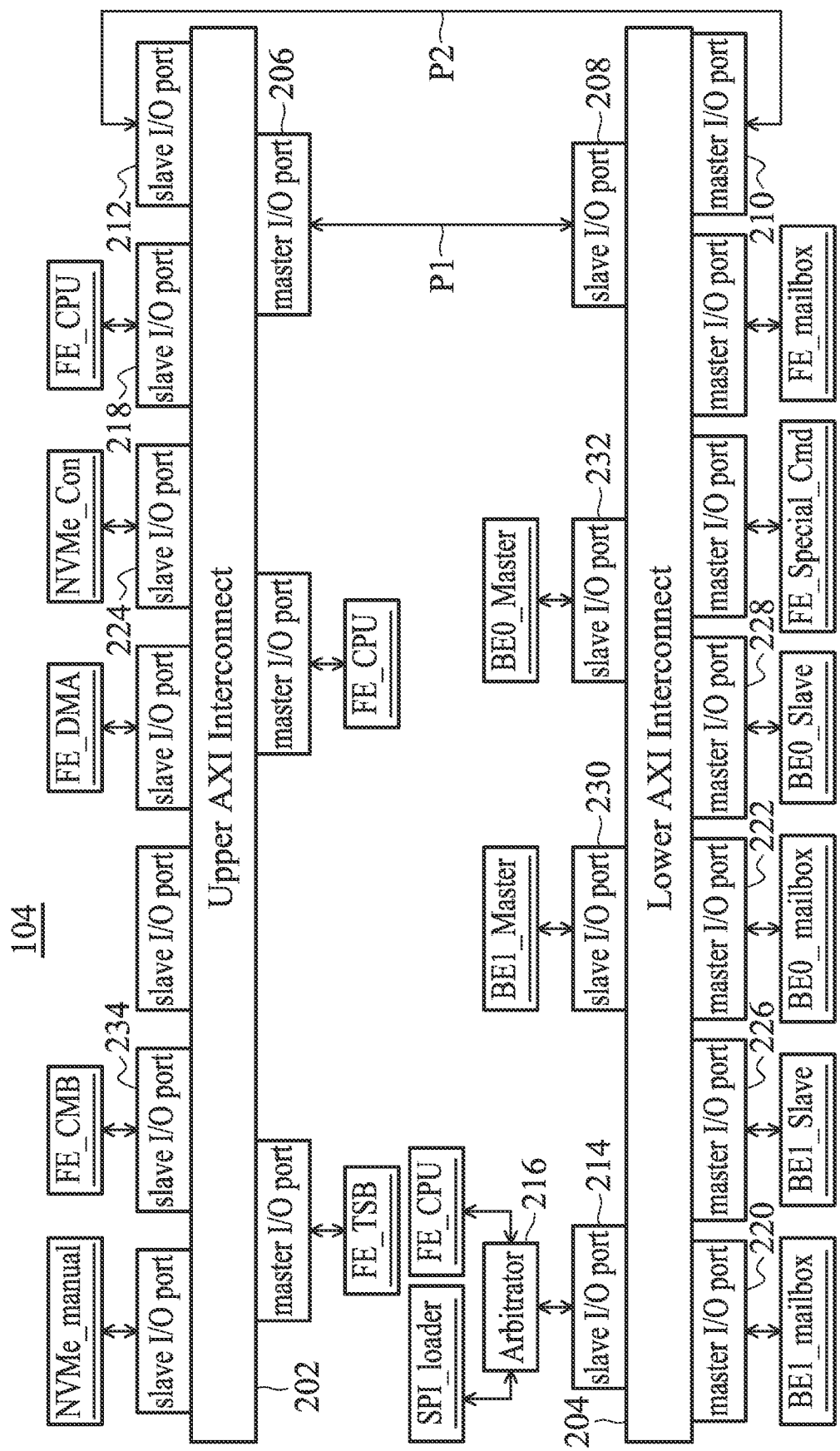
FIG. 2 illustrates the details of the controller 104 in accordance with an exemplary embodiment of the present invention.

FIG. 2 illustrates the details of the controller 104 in accordance with an exemplary embodiment of the present invention, which is divided into a FE stage (wherein the components in the FE stage can be labeled with FE) and a BE stage (wherein the components in the BE stage can be labeled with BE). The AXI bus provides an upper AXI interconnect 202 and a lower AXI interconnect 204 for on-chip communication. The connection ports provided by the AXI bus (including 202 and 204) are divided into two types: master input and output (I/O) ports and slave I/O ports. Different types of communication ports communicate point-to-point. A master Wig I/O port 206 of the upper AXI interconnect 202 is connected to a slave I/O port 208 of the lower AXI interconnect 204 to establish a communication channel P1 from the upper AXI interconnect 202 to the lower AXI interconnect 204, which follows the point-to-point transmission characteristics of the AXI bus. A master I/O port 210 of the lower AXI interconnect 204 is connected to a slave I/O port 212 of the upper AXI interconnect 202 to establish a communication channel P2 from the lower AXI interconnect 204 to the upper AXI interconnect 202, which also follows the point-to-point transmission characteristics of the AXI bus.

In addition to the slave I/O port 212, the upper AXI interconnect 202 has other slave I/O ports. As shown, the controller 104 includes components NVMe_manual, FE_CMB, FE_DMA, NVMe_Con, and FE_CPU which are connected to the slave I/O ports of the upper AXI interconnect 202 as master components. In addition to the master I/O port 206, the upper AXI interconnect 202 has other master I/O ports. The controller 104 includes components FE_TSB and FE_CPU which are connected to the master I/O ports of the upper AXI interconnect 202 as slave components.

The components NVMe_manual and NVMe_Con are the bridge between the controller 104 and the host 106. The component FE_CMB is a front-end command queue, which can be used as a read and write buffer within the SSD controller in the FE stage, or can further be used to implement a flag checking function. The component FE_DMA is a direct memory access (DMA) function module in the FE stage. The component FE_CPU is a front-end central processing unit. The component FE_TSB is a front-end time sharing buffer register, which may be implemented by a static random access memory (SRAM), and can be a temporary storage pool for exchange of data between the different hosts.

In addition to the slave I/O port 208, the lower AXI interconnect 204 has other slave I/O ports. The controller 104 includes components SPI_loader, FE_CPU, BE1_Master, and BE0_Master, which are connected to the slave I/O ports of the lower AXI interconnect 204 as master components. In addition to the master I/O port 210, the lower AXI interconnect 204 has other master I/O ports. The controller 104 includes components BE1_mailbox, BE1_Slave, BE0_mailbox, BE0_Slave, FE_Special_Cmd, and FE_mailbox which are connected to the master I/O ports of the lower AXI interconnect 204 as slave components.

The component SPI loader is a code loader, which loads codes from outside of the controller 104 (e.g., by accessing an external read-only memory through a serial peripheral bus) to be executed by arithmetic units inside the controller 104. These arithmetic units are the FE CPU FE_CPU and CPUs in the BE stage.

The BE stage may include a plurality central processing units. In an exemplary embodiment, the circuit of BE stage is further divided into two parts: BE1 and BE0. Each BE part includes a central processing unit, a DMA memory, and a flash memory controller, and is capable of exchanging data with the flash memory. The central processing unit of the BE part BE1 can be connected to a slave I/O port of the lower AXI interconnect 204 as a master component BE1_Master, and may be further connected to a master I/O port of the lower AXI interconnect 204 as a slave component BE1_Slave. The central processing unit of the BE part BE0 can be connected to a slave I/O port of the lower AXI interconnect 204 as a master component BE0_Master, and may be further connected to a master I/O port of the lower AXI interconnect 204 as a slave component BE0_Slave.

The master component BE1_Master is not limited to the central processing unit of the BE part BE1, and may be components BOP, HDMA, or Flash_trig_host in the BE part BE1. The master component BE0_Master is not limited to the central processing unit of the BE part BE0, and may be components BOP, HDMA, or Flash_trig_host in the BE part BE0. The slave component BE1_Slave is not limited to the central processing unit of the BE part BE1, and may be a dynamic random access memory (DRAM), a time sharing buffer register (TSB), a register (REG), a component Flash_trig_host, or a component NVMe_special_cmd in the BE part BE1. The slave component BE0_Slave is not limited to the central processing unit of the BE part BE0, and may be a dynamic random access memory (DRAM), a time sharing buffer register (TSB), a register (REG), a component Flash_trig_host, or a component NVMe_special_cmd in the BE part BE0.

The BE parts BE1 and BE0 further include memory devices as mailboxes BE1_mailbox and BE0_mailbox, which receive a message that the FE CPU FE_CPU sends to the CPUs of the BE parts BE1 and BE0. The mailboxes BE1_mailbox and BE0_mailbox are connected to the lower AXI interconnect 204 as slave components.

The slave components FE_Special_cmd and FE_mailbox connected to the lower AXI interconnect 204 are FE components. The component FE_Special_cmd (for processing a front-end special command) is provided in the FE stage to accelerate a read request issued from a host. The BE CPU programs the read data obtains from the flash memory into the BE memory (e.g., a BE TSB). By programming the component FE_Special_cmd, the read data temporarily stored in the BE memory (e.g., the BE TSB) is returned to the host. The component FE_mailbox is a mailbox of the FE stage that receives a message that the CPUs of the BE parts BE1 and BE0 send to the FE CPU.

In the present invention, the slave I/O port 214 connected to the code loader SPI loader may be switched to connect to the FE CPU FE_CPU. As shown, an arbitrator 216 is provided to realize this connection switching. In this way, there are two paths for the FE CPU FE_CPU to transmit requests to the BE parts BE1 and BE0.

In the first path, the FE CPU FE_CPU is connected to the slave I/O port 218 of the upper AXI interconnect 202, and is coupled to the lower AXI interconnect 204 through the communication channel P1 from the master I/O port 206 of the upper AXI interconnect 202 to the slave I/O port 208 of the lower AXI interconnect 204. The FE CPU FE_CPU, therefore, can deliver a message to the BE mailbox BE1_mailbox of the BE part BE1 that is connected to the master I/O port 220 of the lower AXI interconnect 204, or it can deliver a message to the BE mailbox BE0_mailbox of the BE part BE0 that is connected to the master I/O port 222 of the lower AXI interconnect 204.

When the code loader SPI_loader is not operating, the arbitrator 216 connects the FE CPU FE_CPU to the slave I/O port 214 to replace the code loader SPI_ loader. A second path for the FE CPU FE_CPU to transmit requests to the BE parts BE1 and BE0 is established. Because of the second path, the FE CPU FE_CPU delivers a message to the BE mailboxes BE1_mailbox (connected to the master I/O port 220 of the lower AXI interconnect 204) and BE0_mailbox (connected to the master I/O port 222 of the lower AXI interconnect 204) without passing through the upper AXI interconnect 202 or the communication channel P1.

The second path do not pass through the communication channel P1 from the master I/O port 206 of the upper AXI interconnect 202 to the slave I/O port 208 of the lower AXI interconnect 204. Thus, the communication channel P1 from the master I/O port 206 of the upper AXI interconnect to and the slave I/O port 208 of the lower AXI interconnect 204 is available for other communication missions.

In the illustration, the non-volatile memory high-speed interface controller (also known as a host bridge controller) NVMe_Con is a bridge to the host 106. The host bridge controller NVMe_Con is connected to a slave I/O port 224 of the upper AXI interconnect 202 and, through the communication channel P1 from the upper AXI interconnect 202 to the lower AXI interconnect 204, the host bridge controller NVMe_Con communicates with a BE component The BE component may be a slave component BE1_Slave of the BE part BE1 connected to a master I/O port 226 of the lower AXI interconnect 204, or a slave component BE0_Slave of the BE part BE0 connected to a master I/O port 228 of the lower AXI interconnect 204.

In an exemplary embodiment, the slave components BE1_Slave and BE0_Slave may be dynamic random access memories (DRAMs). When the host 106 issues a write request to program the flash memory 102, the arbitrator 216 already connects the FE CPU FE_CPU to the slave I/O port 214 of the lower AXI interconnect 204. Through the lower AXI interconnect 204, the FE CPU FE_CPU directly connected to the slave I/O port 214 can deliver a message containing a write request to the BE mailbox BE1_mailbox connected to the master I/O port 220, or to the BE mailbox BE0_mailbox connected to the master I/O port 222, to inform the BE part BE1 or BE0 that a write request for programming the flash memory 102 is waiting to be dealt with. In particular, the write-request message is successfully delivered from the FE stage to the BE stage without passing through the communication channel P1. The idle communication channel P1 can transfer write data. Through the upper AXI interconnect 202, the communication channel P1 and the lower AXI interconnect 204, the host bridge controller NVMe_Con connected to the slave I/O port 224 of the upper AXI interconnect 202 can program the write data to the DRAM that is connected to the master I/O port 226 or 228 of the lower AXI interconnect 204.

In an exemplary embodiment, the master components BE1_Master and BE0_Master are central processing units (CPUs) of the BE parts BE1 and BE0. Through the lower AXI interconnect 204, the BE CPUs BE1_Master and BE0_Master can receive a message containing write requests from the BE mailboxes BE1_mailbox and BE0_mailbox, and acquire the write data from the DRAMs (which are the slave components BE1_Slave and BE0_Slave). According to the received write requests, the BE CPUs BE1_Master and BE0_Master programs the acquired write data into the flash memory 102.

The write data transferred through the communication channel P1 is instantly prepared in the DRAM (the slave component BE1_Slave or BE0_Slave) without being delayed by the transfer of the write-request message. The host 106 can write to the flash memory 102 efficiently.

This paragraph discusses a read request about the flash memory 102. As indicated by the arbitrator 216, the FE CPU FE_CPU is already connected to the slave I/O port 214 of the lower AXI interconnect 204 when the host 106 issues a read request about the flash memory 102. Through the lower AXI interconnect 204, the FE CPU FE_CPU directly connected to the slave I/O port 214 delivers a message containing a read request to the BE mailbox BE1_mailbox connected to the master I/O port 220, or to the BE mailbox BE0_mailbox connected to the master I/O port 222, to inform the BE part BE1 or BE0 that a read request for reading the flash memory 102 is waiting to be dealt with. In particular, the read-request message is successfully delivered from the FE stage to the BE stage without passing through the communication channel P1. The idle communication channel P1 can be used for other uses.

In an exemplary embodiment, after copying the read data from the flash memory 102 to the DRAM (the slave component BE1_Slave or BE0_Slave), a flag in the DRAM is asserted. A write command (e.g., an AXI write command) can be pushed into an FE command queue FE_CMB that is connected to a slave I/O port 234 of the upper AXI interconnect 202. According to the AXI write command, a handshake is performed through the upper AXI interconnect 202, the communication channel P1, and the lower AXI interconnect 204 to check the status of the flag recorded in the DRAM (the slave component BE1_Slave or BE0_Slave). Since the communication channel P1 is not occupied by the FE CPU FE_CPU, the flag identification will not be interrupted by the delivery of read-request message. The asserted flag can be identified immediately.

The read data, therefore, can be acquired from the DRAMs (the slave components BE1_Slave and BE0_Slave) in time, and is immediately returned to the FE stage through the lower AXI interconnect 204, the communication channel P2 from the master I/O port 210 of lower AXI interconnect 204 to the slave I/O port 212 of the upper AXI interconnect 202, and the upper AXI interconnect 202, to answer the read request issued by the host 106.

The arbitrator 216 may include a multiplexer to selectively connect the FE CPU FE_CPU to the slave I/O port 214 of the lower AXI interconnect 204 or the slave I/O port 218 of the upper AXI interconnect 202. The multiplexer can be controlled by the FE CPU FE_CPU itself. The code loader SPI_loader may only operate when the system is turned on, to load programs (e.g., ROM code) to be executed by the CPUs of the FE stage or the BE parts BE1 and BE0. When the code is finished loading, the FE CPU FE_CPU runs according to the loaded code to disconnect the code loader SPI_loader from the slave I/O port 214 of the lower AXI interconnect 204, and switch the multiplexer of the arbitrator 216. According to the switched multiplexer, the FE CPU FE_CPU is connected to the slave I/O port 214 of the lower AXI interconnect 204 rather than the slave I/O port 218 of the upper AXI interconnect 202.

Figure 3:
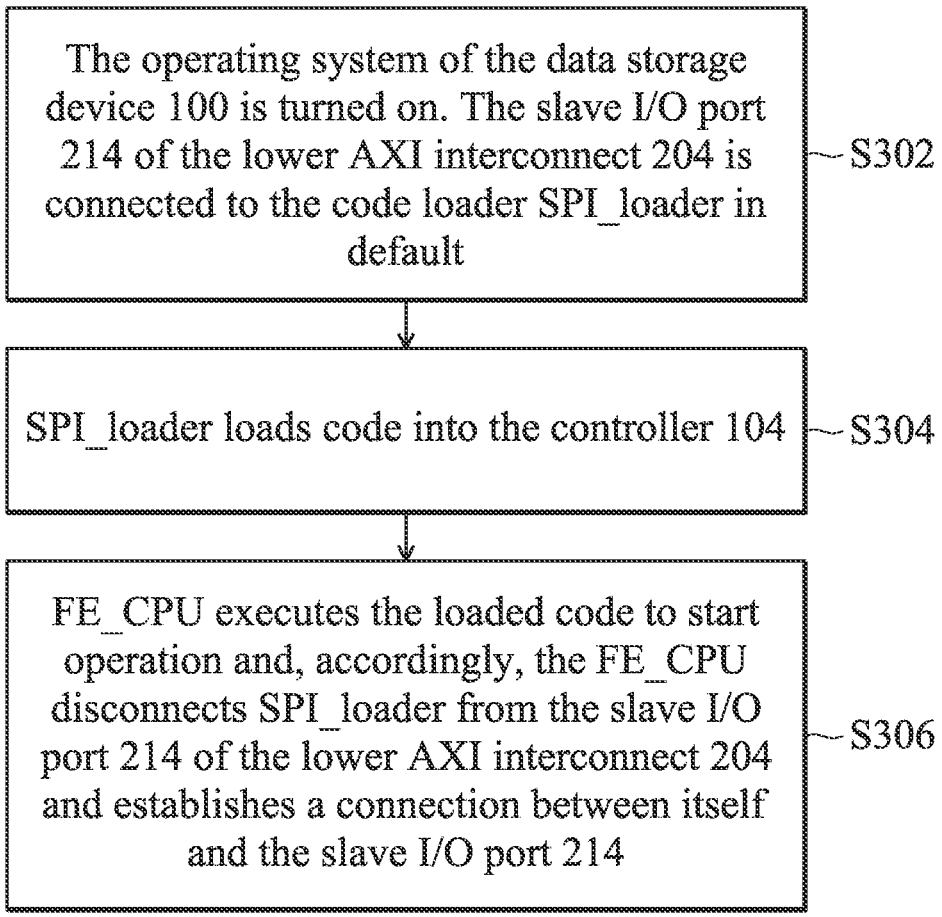
FIG. 3 is a flowchart, depicting how to change the FE CPU FE_CPU to connect to the upper AXI interconnect 202 or to the lower AXI interconnect 204 in accordance with an exemplary embodiment of the present invention.

FIG. 3 is a flowchart, depicting how to change the FE CPU FE_CPU to connect to the upper AXI interconnect 202 or to the lower AXI interconnect 204 in accordance with an exemplary embodiment of the present invention.

In step S302, the operating system of the data storage device 100 is turned on. The slave I/O port 214 of the lower AXI interconnect 204 is connected to the code loader SPI_loader in default.

In step S304, the code loader SPI_loader loads code into the controller 104. Through the lower AXI interconnect 204, BE code is loaded to the BE parts BE1 and BE0 (for example, loaded to the slave components BE1_Slave and BE0_Slave) to be executed by the CPUs of the BE parts BE1 and BE0. Through the lower AXI interconnect 204, the communication channel P2 from the master I/O port 210 of the lower AXI interconnect 204 to the slave I/O port 212 of the upper AXI interconnect 202, and the upper AXI interconnect 202, FE code is loaded to the FE stage to be executed by the FE CPU FE_CPU.

In step S306, the FE CPU FE_CPU executes the loaded code to start operation. According to the loaded code, the FE CPU FE_CPU disconnects the code loader SPI_loader from the slave I/O port 214 of the lower AXI interconnect 204, and establishes a connection between itself and the slave I/O port 214.

Thus, after the data storage device 100 is started up, the FE CPU FE_CPU no longer occupies the communication channel P1 from the master I/O port 206 of the upper AXI interconnect 202 to the slave I/O port 208 of the lower AXI interconnect 204.

The forgoing techniques that the controller 104 operates the flash memory 102 may be implemented in the other structures. Any technique optimizing the on-chip bus based on the aforementioned concepts for high speed transmission between the FE stage and the BE stage of the controller 104 should be regarded as within the scope of the present invention. Control methods based on the aforementioned concepts are also proposed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a multi-stage controller coupled to the non-volatile memory, including an upper on-chip interconnect and a lower on-chip interconnect,
wherein:
the multi-stage controller further includes a code loader, a front-end central processing unit and an arbitrator;
when being connected to the lower on-chip interconnect, the code loader loads a code from a read-only memory to operate the multi-stage controller;
when the code is finished loading, the code loader is disconnected from the lower on-chip interconnect and the arbitrator connects the front-end central processing unit to the lower on-chip interconnect; and
the multistage controller further includes a host bridge controller connected to the upper on-chip interconnect, and a back-end memory connected to the lower on-chip interconnect.

2. The data storage device as claimed in claim 1, wherein:
the multi-stage controller further includes a back-end mailbox; and
the back-end mailbox is connected to the lower on-chip interconnect to receive a message that the front-end central processing unit sends to a back-end central processing unit of the multi-stage controller.

3. The data storage device as claimed in claim 2, wherein:
the front-end central processing unit that replaces the code loader to connect to the lower on-chip interconnect delivers a write-request message to the back-end mailbox without passing through the upper on-chip interconnect or a first communication channel from the upper on-chip interconnect to the lower on-chip interconnect.

4. The data storage device as claimed in claim 3, wherein:
through the upper on-chip interconnect, the first communication channel, and the lower on-chip interconnect, the host bridge controller programs write data into the back-end memory for temporary storage.

5. The data storage device as claimed in claim 4, wherein:
the back-end central processing unit is connected to the lower on-chip interconnect;
after reading the write-request message from the back-end mailbox, the back-end central processing unit obtains the write data from the back-end memory and programs the write data into the non-volatile memory.

6. The data storage device as claimed in claim 2, wherein:
the multi-stage controller further includes a front-end command queue connected to the upper on-chip interconnect, and a back end memory connected to the lower on chip interconnect.

7. The data storage device as claimed in claim 6, wherein:
the front-end central processing unit that replaces the code loader to connect to the lower on-chip interconnect delivers a read-request message to the back-end mailbox without passing through the upper on-chip interconnect or a first communication channel from the upper on-chip interconnect to the lower on-chip interconnect.

8. The data storage device as claimed in claim 7, wherein:
the back-end central processing unit is connected to the lower on-chip interconnect;
after reading the read-request message from the back-end mailbox, the back-end central processing unit reads the non-volatile memory to get read data, and programs the read data into the back-end memory for temporary storage; and
after finishing programming the read data into the back-end memory, the back-end central processing unit asserts a flag in the back-end memory to show that the read data is ready in the back-end memory.

9. The data storage device as claimed in claim 8, which pushes a write command into the front-end command queue to start a handshake to the back-end memory to check the flag in the back-end memory through the upper on-chip interconnect, the first communication channel, and the lower on-chip interconnect.

10. The data storage device as claimed in claim 1, wherein:
a first communication channel is established by connecting a first master input and output (I/O) port of the upper on-chip interconnect to a first slave I/O port of the lower on-chip interconnect.

11. The data storage device as claimed in claim 10, wherein:
a first master I/O port of the lower on-chip interconnect is connected to a first slave I/O port of the upper on-chip interconnect to establish a second communication channel from the lower on-chip interconnect to the upper on-chip interconnect; and
when the code loader is connected to a second slave I/O port of the lower on-chip interconnect and the front-end central processing unit is connected to a second master I/O port of the upper on-chip interconnect as indicated by the arbitrator, the code loader loads code to the front-end central processing unit through the lower on-chip interconnect, the second communication channel, and the upper on-chip interconnect.

12. The data storage device as claimed in claim 11, wherein:
when the code loader is disconnected from the second slave I/O port of the lower on-chip interconnect and the arbitrator connects the front-end central processing unit to the second slave I/O port of the lower on-chip interconnect, the first communication channel is not occupied by transmission of requests issued by the front-end central processing unit.

13. The data storage device as claimed in claim 12, wherein:
the multi-stage controller further includes a back-end mailbox connected to a second master I/O port of the lower on-chip interconnect;
a message that the front-end central processing unit connected to the second slave I/O port of the lower on-chip interconnect sends to a back-end central processing unit of the multi-stage controller is delivered to the back-end mailbox.

14. The data storage device as claimed in claim 13, wherein:
the host bridge controller is connected to a second slave I/O port of the upper on-chip interconnect;
the back-end memory is connected to a third master I/O port of the lower on-chip interconnect; and
the host bridge controller programs write data into the back-end memory for temporary storage through the first communication channel.

15. The data storage device as claimed in claim 14, wherein:

the multi-stage controller further includes a front-end command queue connected to a third slave I/O port of the upper on-chip interconnect;

a write command is pushed into the front-end command queue to start a handshake to the back-end memory to check a flag in the back-end memory through the first communication channel; and the flag is asserted after finishing programming read data obtained from the non-volatile memory into the back-end memory for temporary storage.

16. The data storage device as claimed in claim 12, wherein:

as indicated by the arbitrator, the second slave I/O port of the lower on-chip interconnect is connected to the code loader or the front-end central processing unit.

17. The data storage device as claimed in claim 1, wherein:

the upper on-chip interconnect and the lower on-chip interconnect are implemented as an Advanced eXtensible Interface (AXI) bus.

* * * * *

UNITED STATES PATENT AND TRADEMARK OFFICE
CERTIFICATE OF CORRECTION

PATENT NO. : 11,573,730 B2
APPLICATION NO. : 17/204067
DATED : February 7, 2023
INVENTOR(S) : An-Pang Li Page 1 of 1

It is certified that error appears in the above-identified patent and that said Letters Patent is hereby corrected as shown below:

In the Specification

In Column 4, Line 48: please delete "Wig"

In the Claims

In Claim 6, Column 9, Lines 55-56: please delete ", and a back-end memory connected to the lower on chip interconnect"

Signed and Sealed this
Twenty-fifth Day of April, 2023

Katherine Kelly Vidal
*Director of the United States Patent and Trademark Office*